(12) United States Patent
Yamamoto

(10) Patent No.: US 6,449,399 B1
(45) Date of Patent: Sep. 10, 2002

(54) ILLUMINATION OPTICAL DEVICE AND IMAGE READING DEVICE

(75) Inventor: Yasuhiro Yamamoto, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/131,414

(22) Filed: Aug. 10, 1998

(30) Foreign Application Priority Data

Aug. 11, 1997 (JP) .......................................... 09-228845
Aug. 22, 1997 (JP) .......................................... 09-241832

(51) Int. Cl.[7] .............................. H04N 1/46; G06K 7/00
(52) U.S. Cl. ........................................ 382/382; 358/506
(58) Field of Search ............................ 382/312; 358/474, 358/506, 484, 487, 511, 512, 509

(56) References Cited

U.S. PATENT DOCUMENTS

| | | | | |
|---|---|---|---|---|
| 5,341,245 A | * | 8/1994 | Tamagawa | 359/739 |
| 6,054,703 A | * | 4/2000 | Liu | 250/208.1 |
| 6,288,815 B1 | * | 9/2001 | Lambert | 359/196 |
| 6,301,024 B1 | * | 10/2001 | Yamamoto | 358/509 |

FOREIGN PATENT DOCUMENTS

| | | | | |
|---|---|---|---|---|
| JP | 405083717 | * | 4/1993 | H04N/9/04 |
| JP | 405103157 A | * | 4/1993 | H04N/1/04 |
| JP | 8-167972 | | 6/1996 | |

OTHER PUBLICATIONS

Copy of an English Language Abstract of JP No. 8–167972.

* cited by examiner

*Primary Examiner*—Jerome Grant, II
(74) *Attorney, Agent, or Firm*—Greenblum & Bernstein, P.L.C.

(57) ABSTRACT

The illumination optical device has a collimator lens and a light source. The light source is provided with light-emitting diodes radiating green, red and blue light beams, respectively. The light-emitting diodes are arranged on a straight line, which is perpendicular to the optical axis of the collimator lens and which intersects a focal point of the collimator lens. Each of the green, red and blue light beams is changed to a parallel beam by the collimator lens, and is then changed to a strip-shaped light beam by a cylindrical lens which is provided between the collimator lens and a film. The film is disposed in such a manner that each of the light beams is made incident on the film.

22 Claims, 14 Drawing Sheets

ILLUMINATION OPTICAL DEVICE AND IMAGE READING DEVICE

BACKGROUND OF THE INVENTION

1. Field of the Invention

The present invention relates to an image reading device by which an image signal, recorded in a recording medium, is sensed using a line sensor, for example.

2. Description of the Related Art

Conventionally, there is known an image reading device, sensing an image signal using a line sensor, in which an illumination mechanism is provided with a light source comprising multiple light-emitting diodes to ensure that an adequate amount of light is received by the line sensor, and also a divergent optical system is provided so that the unevenness of the amount of light is equalized. Further, in an image reading device disclosed in Japanese Unexamined Patent Publication No. 8-167972, the light-emitting diodes are arranged on two separate lines, and a superposing optical system is provided to superpose light beams emitted by the two lines of light-emitting diodes onto a single line corresponding to the line sensor.

In the illumination mechanisms, however, many optical members are needed, and thus the construction is complex.

On the other hand, in a sensing method utilized in the image reading device whereby a focal point is detected, there is known a method by which, based on an image signal read by the line sensor, a contrast of the image is calculated, and the focal point is detected in accordance with the peak value of the contrast. The contrast is obtained by subtracting a filtered signal, which is obtained by applying a low-pass-filtering process to the image signal, from the image signal, and integrating the filtered signal.

In the sensing method, however, it is necessary to carry out a complicated calculation in the low-pass-filtering process, and it is necessary to consider whether a frequency characteristic of an object to be read is changed. Further, if the image signal contains noise, the peak value of the contrast cannot be calculated exactly, since the noise, for example, is also integrated.

SUMMARY OF THE INVENTION

Therefore, an object of the present invention is to provide an illumination optical device in which the number of optical members is reduced to simplify construction.

According to the present invention, there is provided an illumination optical device, mounted in an image reading device, comprising a plurality of light-emitting elements and an optical system.

The plurality of light-emitting elements are arranged on a straight line. The light-emitting elements radiate light beams of color components which are different from each other. The optical system is disposed such that the optical axis of the optical system is perpendicular to the straight line, so that the light beams are radiated onto a recording medium.

Further, according to the present invention, there is provided an image reading device comprising a light source, a first optical system, an imaging device, a second optical system, an out-of-register detecting processor and a moving mechanism.

The light source radiates first, second and third light beams having first, second and third color components, respectively. The first optical system changes the first light beam to a first parallel beam, which is parallel to the optical axis of the first optical system, and changes the second and third light beams to second and third parallel beams, respectively, which are inclined to the optical axis. The first, second and third parallel beams are led to a recording medium in which an image is recorded. The imaging device, which includes a light receiving surface on which the image is formed, outputs pixel data corresponding to the image. The second optical system forms the image on the light receiving surface based on the first, second and third parallel beams becoming incident on the recording medium. The out-of-register detecting processor detects an out-of-register value in accordance with the pixel data, which is a deviation between first and second portions on the light receiving surface. The first portion is illuminated by a light beam corresponding to the first parallel beam radiated on an area of the recording medium, and also the second portion is illuminated by a light beam corresponding to one of the second and third parallel beams radiated on the area. The moving mechanism moves either the imaging device or the recording medium along the optical axis of the first optical system in accordance with the obtained out-of-register value.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
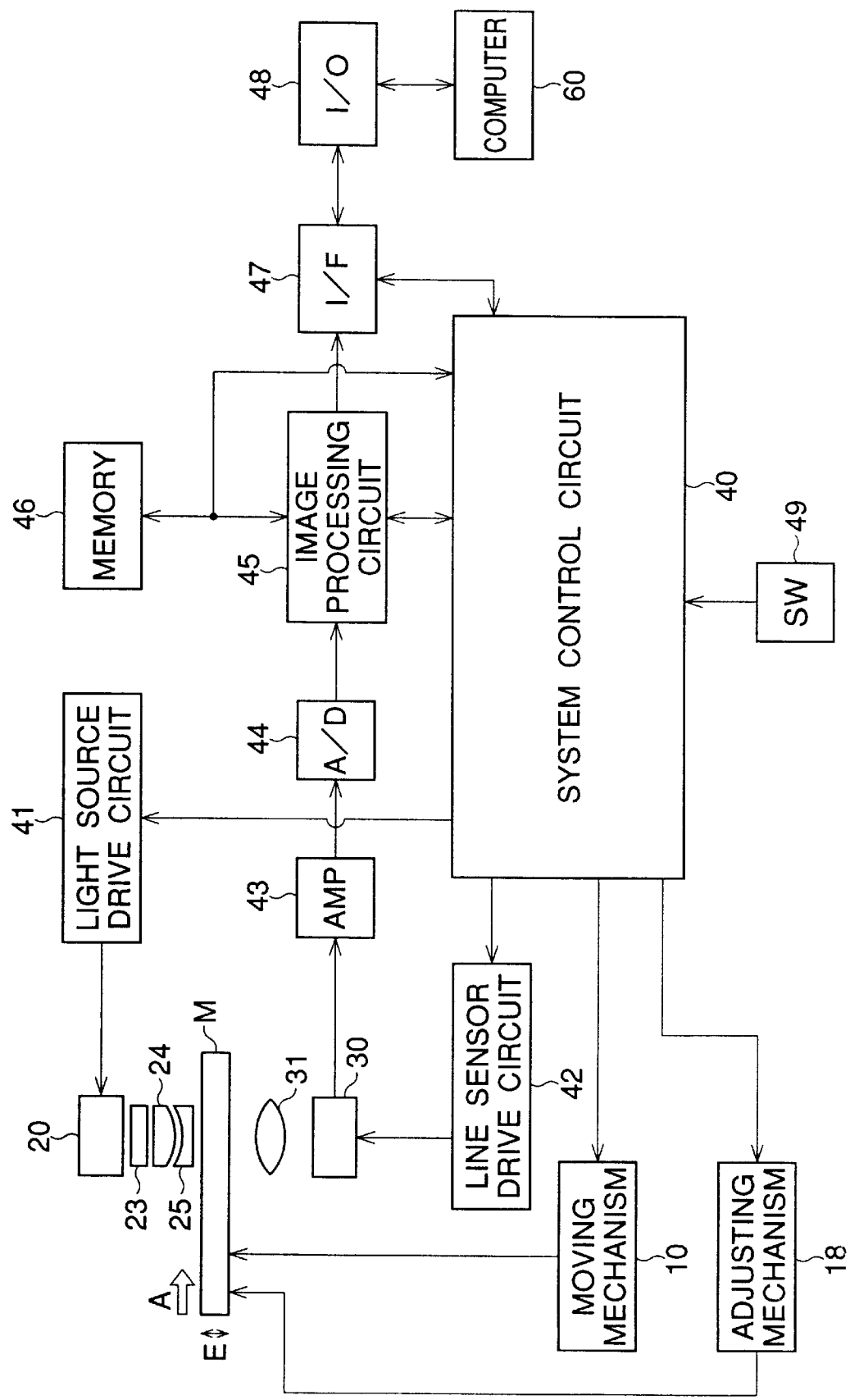
FIG. 1 is a block diagram showing an image reading device of first, second, third, fourth and fifth embodiments of the present invention.

The present invention will be described below with reference to embodiments shown in the drawings.

FIG. 1 shows a block diagram of an image reading device used in first, second, third, fourth and fifth embodiments of the present invention.

A read object M, handled by this image reading device, is a transparent film on which a color image has been recorded. The film M is intermittently moved, by a film moving mechanism 10, in directions shown by an arrow A. Further, the film M can be shifted in an upward or downward direction, shown by an arrow E, using an up-down position adjusting mechanism 18, so that an in-focus control is performed, as described later.

A light source 20 is disposed above a path along which the film M is moved, and a collimator lens 23 and cylindrical lenses 24 and 25 are disposed between the light source 20 and the film M. A line sensor 30 and a forming lens 31 are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The film moving mechanism 10, the adjusting mechanism 18, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. the pixel data), read through the line sensor 30, is amplified by an amplifier 43 and is converted to a digital signal by an A/D converter 44. The digital pixel data are subjected to an image process, such as a shading correction, in an image processing circuit 45, and are then stored in a memory 46.

The digital pixel data, subsequent to being read from the memory 46, are subjected to various correction processes, such as a color correction and a gamma correction. Then, the corrected digital pixel data are converted to a signal, which conforms to a predetermined format, by an interface circuit 47, and are outputted through an input/output terminal 48 to an external computer 60, which is provided outside the image reading device. The image processing circuit 45 and the interface circuit 47 are controlled by the system control circuit 40.

In these embodiments, although all of the operations can be controlled by the external computer 60, a switch 49 may be connected to the system control circuit 40, so that various operations can be directly performed, such as the image reading operation, for example.

Figure 2:
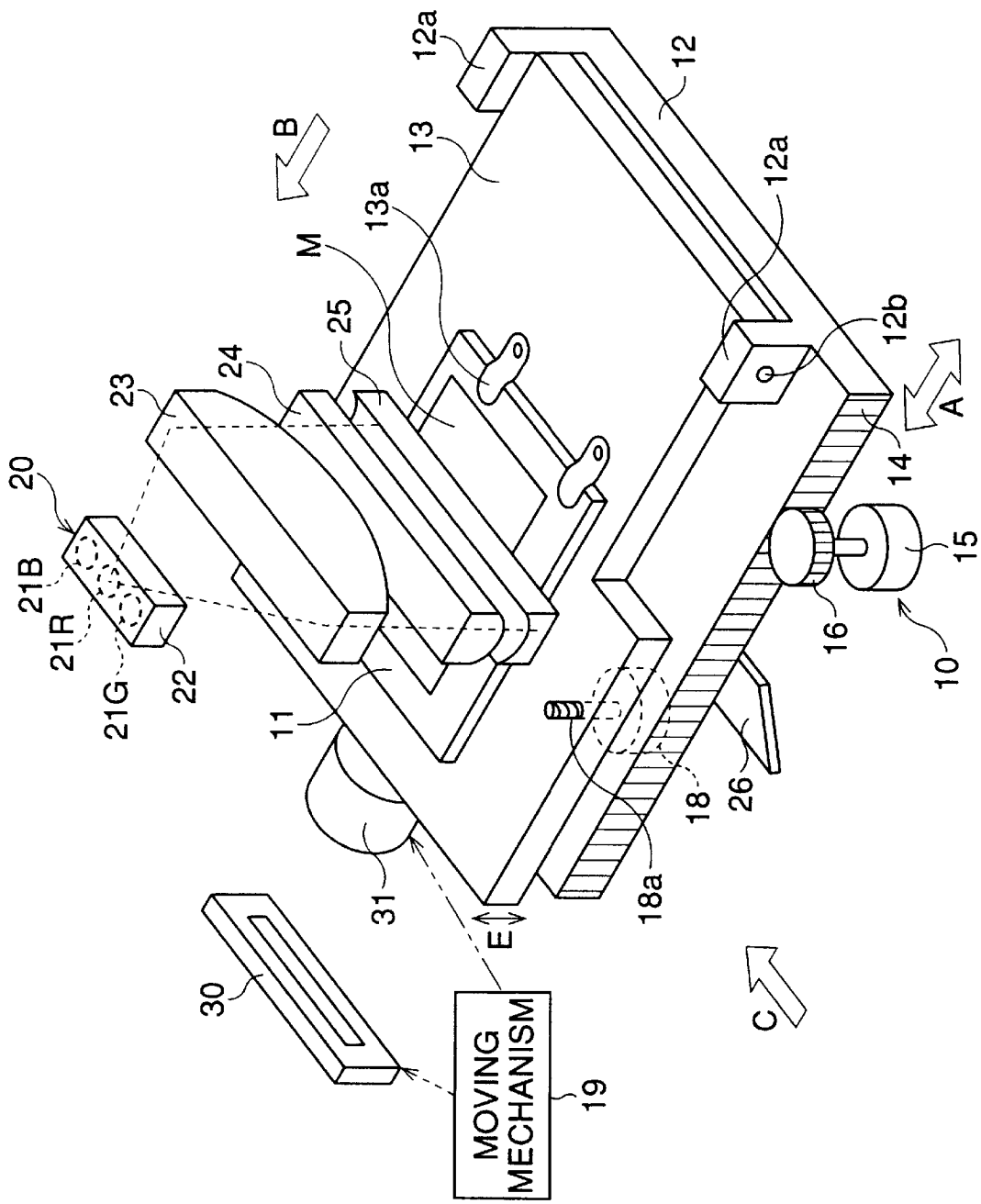
FIG. 2 is a perspective view showing a moving mechanism, a light source and a line sensor, when a transparent film is used.

FIG. 2 shows the moving mechanism 10, the light source 20 and the line sensor 30. The film M is supported by a frame 11, which is fixed on a support plate 13 by fasteners 13a. The support plate 13 is placed on a stage 12, and is rotatably fixed by a pin 12b at a projection 12a formed on the stage 12. The adjusting mechanism 18, which may comprise a motor, is provided under the stage 12, and an output shaft 18a of the adjusting mechanism 18 passes through the stage 12 and is threadingly engaged with the support plate 13. Thus, when the output shaft 18a rotates, the support plate 13 also rotates slightly about the pin 12b, enabling the film M to be slightly raised or lowered. Note that the relative amount of up-down movement of the film M is small enough for it to be considered as linear movement.

An opening (not shown) is formed in the support plate 13 and in the stage 12 at a position corresponding to the film M, so that a light beam radiated onto the film M can pass through the film M. A rack 14 is formed on a side surface of the stage 12. A pinion 16, fixed on an output shaft of a feeding motor 15, is meshed with the rack 14. The feeding motor 15, which is a stepping motor, for example, is driven under control of the system control circuit 40, so that the position and the moving speed of the film M are controlled.

The light source 20, positioned above the stage 12, is provided with light-emitting diodes 21G, 21R and 21B, which radiate G(green), R(red) and B(blue) light beams, respectively. The light-emitting diodes 21G, 21R and 21B, supported by a slender support member 22, extending in a breadth direction of the stage 12, are arranged in this order along the support member 22. The light-emitting diodes 21G, 21R and 21B are separately turned ON in a predetermined order.

The collimator lens 23 is disposed under the support member 22, and the cylindrical lenses 24 and 25 are positioned between the collimator lens 23 and the stage 12. The collimator lens 23 and the cylindrical lenses 24 and 25 are extended in parallel with the support member 22.

A mirror 26 is provided under the stage 12. The mirror 26 is extended in parallel with the collimator lens 23 and the cylindrical lenses 24 and 25. The mirror 26 is inclined to the stage 12 at approximately 45 degrees. The line sensor 30 is disposed under the stage 12, in front of the mirror 26, and the forming lens 31 is disposed between the mirror 26 and the line sensor 30. Therefore, the light beams, radiated by the light-emitting diodes 21G, 21R and 21B, pass through the lenses 23, 24 and 25 and the film M, before being reflected by the mirror 26 to become incident on a light receiving surface 30a of the line sensor 30 through the forming lens 31. Thus, an image recorded on the film M is formed on the light receiving surface 30a of the line sensor 30.

The line sensor 30 and the forming lens 31 are integrally connected to a second moving mechanism 19, controlled by the system control circuit 40, enabling movement along the optical axis of the forming lens 31.

Figure 3:
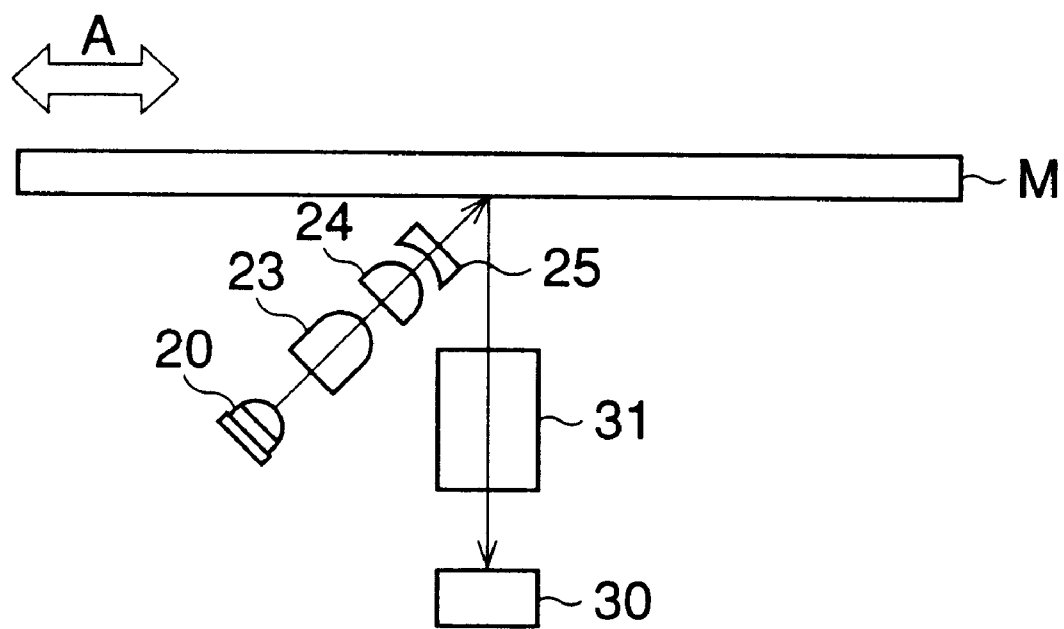
FIG. 3 is a view showing a structure, including a light source and a line sensor, used for reading an image recorded on a read object from which a light beam is reflected.

FIG. 3 shows an alternative structure, that includes the light source 20 and the line sensor 30, used for reading an image recorded on a read object M from which a light beam is reflected. In this structure, the light source 20, the collimator lens 23, the cylindrical lenses 24 and 25, the line sensor 30 and the forming lens 31 are disposed under the read object M. Namely, a light beam outputted from the light source 20 radiates on the lower surface of the read object M, through the collimator lens 23 and the cylindrical lenses 24 and 25, so that the light beam reflected by the read object M enters the line sensor 30 through the forming lens 31.

Figure 4:
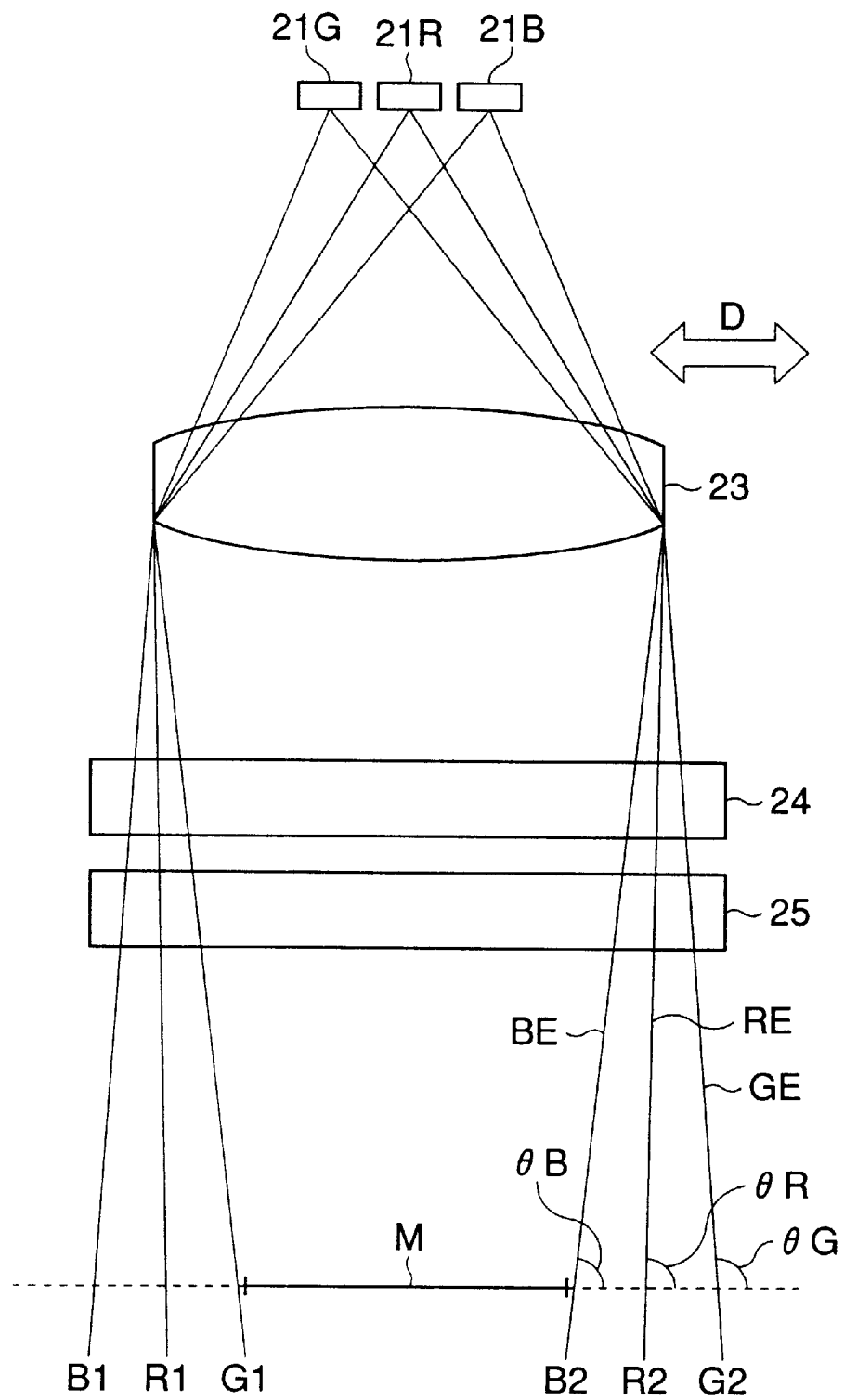
FIG. 4 is a view showing an illumination optical device of the first embodiment.

FIG. 4 shows an illumination optical device of the first embodiment, viewed along arrow B shown in FIG. 2. Green, red and blue light beams, radiated from the light-emitting diodes 21G, 21R and 21B, are changed by the collimator lens 23 to parallel beams as shown in FIG. 4. The green, red and blue parallel beams are condensed by the cylindrical lenses 24 and 25 in a direction perpendicular to the plane of FIG. 4 in which the film M is moved, so that strip-shaped light beams, extending in a direction shown by an arrow D, are radiated onto the film M. Note that the cylindrical lens 24 condenses the light beams radiated by the collimator lens 23 in a direction in which the film M is moved, and the cylindrical lens 25 changes the light beams radiated by the collimator lens 23 to parallel beams.

Thus, on the film M, the green light beam illuminates a range between points G1 and G2, the red light beam illuminates a range between points R1 and R2, and the blue light beam illuminates a range between points B1 and B2.

Since the light-emitting diode 21R is positioned between the light-emitting diodes 21G and 21B, the point R1 is positioned between the points B1 and G1, and the point R2 is positioned between the points B2 and G2. In other words, a portion between the points G1 and B2 is illuminated by each of the green, red and blue light beams. The film M is placed between the points G1 and B2, so that each of the green, red and blue light beams is incident on the film M, and thus, the light beams passing through or reflected by the film M are sensed by the line sensor 30.

The light-emitting diodes 21G, 21R and 21B are arranged on the same straight line, which intersects a focal point of the collimator lens 23 and is perpendicular to the optical axis of the collimator lens 23. Among the light-emitting diodes 21G, 21R and 21B, the light-emitting diode 21R has the smallest size and is thus disposed at the center, i.e. symmetrically between, the light-emitting diodes 21G and 21B, so that the light-emitting diodes 21G and 21B can be positioned as close to each other as possible. In other words, the light-emitting diodes 21G and 21B are positioned as close to the optical axis of the collimator lens 23 as possible.

Accordingly, when a light beam RE, radiated from the light-emitting diode 21R, enters the film M and the line sensor 30 at an angle θR, which is approximately a right angle, light beams GE and BE radiated from the light-emitting diodes 21G and 21B, respectively, enter the film M and the line sensor 30 at angles θG and θB, which are close to right angles. Namely, the angles θG and θB are not right angles, with the angle θG being greater than the angle θR, and the angle θB being less than the angle θR.

If the light-emitting diodes 21G and 21B were to be disposed further from the light-emitting diode 21R on the straight line, the angle θG would become greater, and the angle θB would become less. Thus, the angles θG and θB change in accordance with the positions of the light-emitting diodes 21G and 21B relative to the optical axis of the collimator lens 23. If the angles θG, θR and θB are changed, a range which is illuminated by each of the green, red and blue light beams, i.e. a distance between the points G1 and B2, is changed. Therefore, when the light-emitting diode 21R is positioned on the optical axis of the collimator lens 23, and the light-emitting diodes 21G and 21B are disposed as close to the optical axis as possible, the range from the point G1 to the point B2 becomes the greatest, so that an area, in which the film M can be placed, becomes a maximum. Note that the offset or deviation of each range, corresponding to the respective green, red and blue light beams, is generated in a plane of FIG. 4, and not in a plane perpendicular to the plane of FIG. 4 and parallel to the optical axis of the collimator lens 23.

In this embodiment, since the light-emitting diodes 21G, 21R and 21B are arranged on a single straight line, the number of optical elements is reduced in comparison with a conventional device in which multiple respective light-emitting diodes, radiating green, red and blue light beams are arranged on two lines with optical elements provided for superposing the light beams radiated from the two lines of light-emitting diodes.

Since the number of each of the light-emitting diodes 21G, 21R and 21B is one in the embodiment, the amount of light obtained by the light-emitting diodes 21G, 21R and 21B is less than a construction in which multiple light-emitting diodes are provided. Therefore, in the illumination optical device of the embodiment, if a divergent optical system is provided so as to reduce an unevenness in illumination, the amount of light received by the line sensor 30 would be reduced. Therefore, in the embodiment, the cylindrical lenses 24 and 25 are provided to condense the light beams in one plane, which includes directions shown by the arrow A, compensating for the lack of multiple respective LED's. In other words, each of the cylindrical lenses 24 and 25 has a power that acts to converge a luminous flux radiated from the collimator lens 23 in directions in which the film M is moved, i.e. parallel to and in the directions of the arrow A. Therefore, in the embodiment, the divergent optical system can be omitted, while still ensuring a proper amount of light for each of the color components.

Figure 5:
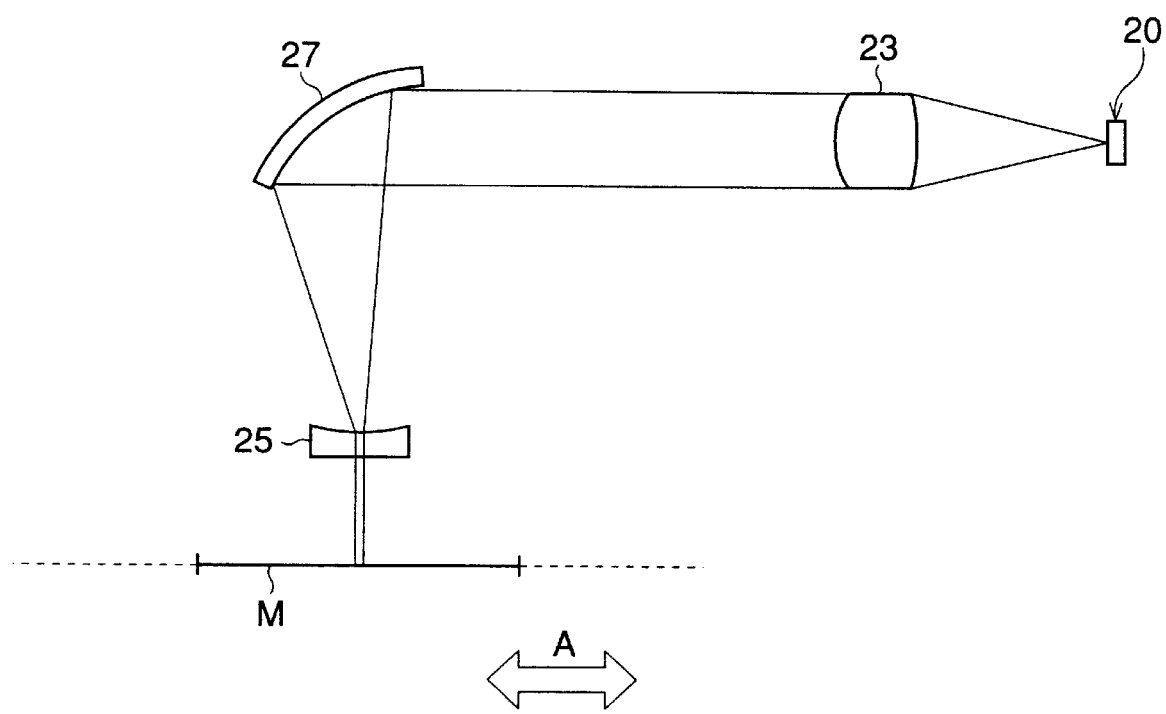
FIG. 5 is a view showing an illumination optical device of the second embodiment.

FIG. 5 shows a second embodiment of the present invention. The difference between the first and second embodiments is that a concave mirror 27 is provided instead of the cylindrical lens 24, with the other constructions being the same.

FIG. 5 is a side view when viewing the illumination mechanism from an arrow C shown in FIG. 2. The light source 20 is provided with the light-emitting diodes 21G, 21R and 21B arranged in a direction perpendicular to the plane of FIG. 5. A light beam radiated from each of the light-emitting diodes 21G, 21R and 21B is changed to a parallel beam by the collimator lens 23, which is then reflected by the concave mirror 27 such that the parallel beam is condensed only in one plane, which includes directions of movement of the film M, indicated by the arrow A. The condensed light beam is changed by the cylindrical lens 25 to become a parallel beam in a plane of FIG. 5, before entering the film M.

According to the second embodiment, the same effects as the first embodiment are obtained. Namely, single light-emitting diodes, radiating the green, red and blue light beams, respectively, can be utilized, and a divergent optical member and a superposing optical member can be omitted, so that the illumination optical device can be constructed from a relatively small number of optical members. Therefore, the illumination optical device is simplified so that the manufacturing cost is reduced. Further, by providing the concave mirror 27, the disposal of the light source 20 relative to the film M can be changed without increasing the number of optical members, and thus a degree of freedom is improved.

As described above, in the first and second embodiments, the light-emitting diodes 21G, 21R and 21B are arranged on the line that intersects the optical axis of the collimator lens 23, and the film M is disposed at a position, between the points G1 and B2, where each of the green, red and blue light beams is incident. Conversely, in third and fourth embodiments, taking advantage of out-of-register on the line sensor 30, the film M is controlled so as to be placed at an in-focus position where an image, which is recorded on the film M and is formed through the forming lens 31, is focused on the line sensor 30, as described below. Note that "out-of-register" implies an offset or shift of a range illuminated by each of the light-emitting diodes 21G, 21R and 21B.

Note that an out-of-register value is obtained due to a deviation between first and second portions on the line sensor 30, the first portion being illuminated by a light beam corresponding to a first parallel beam radiated on an area of the film M, the second portion being illuminated by a light beam corresponding to one of second and third parallel beams radiated on the area. If out-of-register occurs on the line sensor 30, green, red and blue images are reproduced at offset positions from each other, due to the out-of-register value, on a surface of a display device connected to the computer 60.

Figure 6:
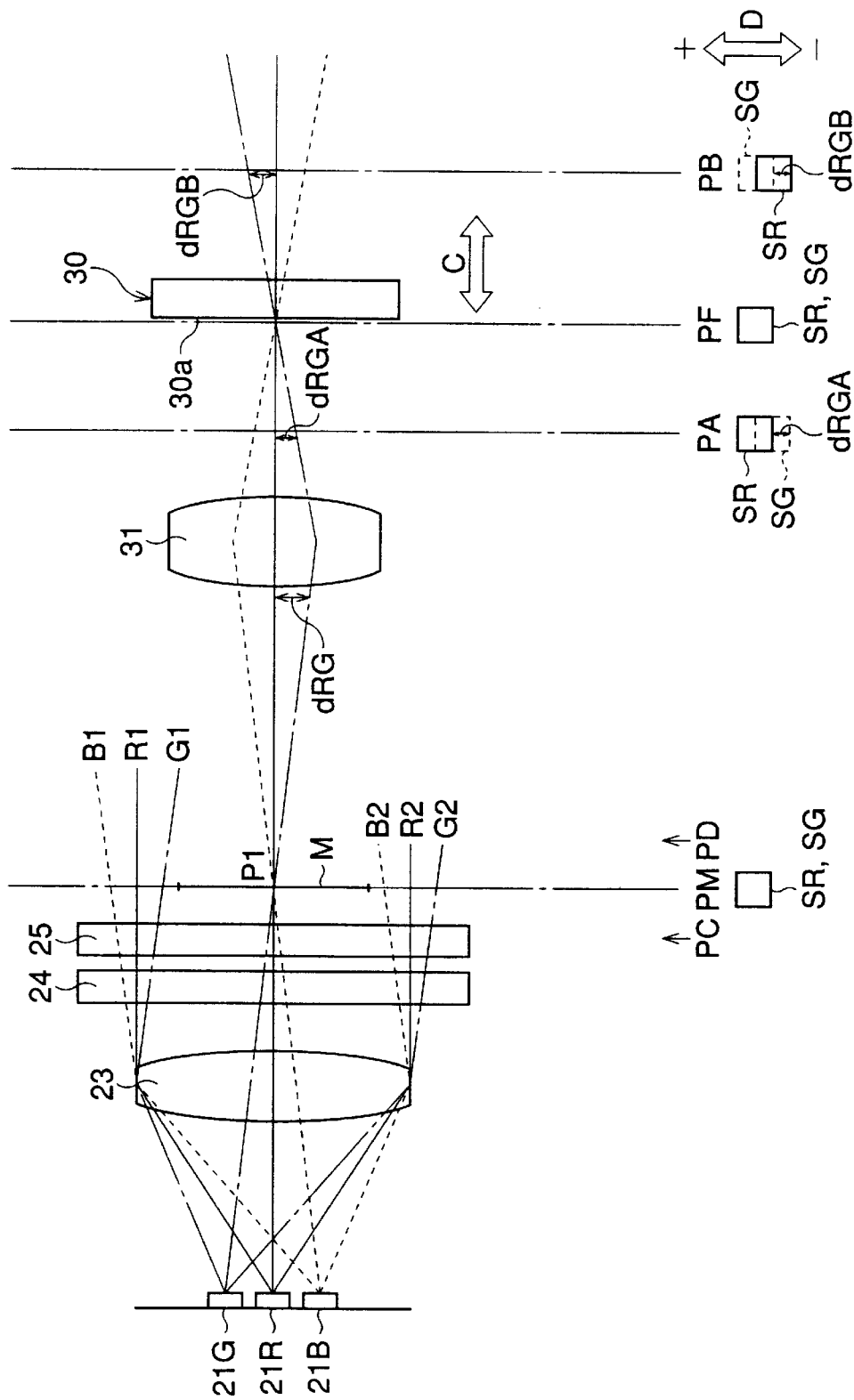
FIG. 6 is a view showing an illumination optical device, for explaining the principle of the third and fourth embodiments.

With reference to FIG. 6, the principle of the third and fourth embodiments is described below. Note that, in FIG. 6, an arrow D indicates the longitudinal direction of the line sensor 30, the upward direction being referred to as a positive direction and the downward direction being referred to as a negative direction, hereinafter.

A light beam passing through the film M enters the light receiving surface 30a of the line sensor 30 through the forming lens 31. Regarding the green and red light beams entering a portion P1 on a film surface PM on which the film M is placed, a spot SG, which is illuminated by the green light beam on the film surface PM, is at the same position as a spot SR, which is illuminated by the red light beam on the film surface PM. Since the light-emitting diodes 21G, 21R and 21B are disposed at different positions, the green light beam passing through the portion P1 enters a position, which is offset by the amount "dRG" in the negative direction from the red light beam, on the forming lens 31. The green and red light beams are condensed by the forming lens 31, so that an optical image of the portion P1 is formed on the in-focus position PF, which is optically conjugate to the portion P1 about the forming lens 31. Namely, in the in-focus position PF, the green and red light beams enter the same spot, so that the green spot SG and the red spot SR are at the same positions.

If the line sensor 30 were to be placed at a position PA, which is closer to the forming lens 31 in comparison with the in-focus position PF, the green light beam would enter the line sensor 30 at a position which is offset by the amount "dRGA" in the negative direction from the red light beam. Namely, the green spot SG would be offset by the amount "dRGA" in the negative direction from the red spot SR.

Conversely, if the line sensor 30 were to be placed at a position PB, which is separated from the forming lens 31 in comparison with the in-focus position PF, the green light beam would enter the line sensor 30 at a position which is offset by the amount "dRGB" in the positive direction from the red light beam. Namely, the green spot SG would be offset by the amount "DRGB" in the positive direction from the red spot SR.

Thus, when the line sensor 30 is offset from the in-focus position PF, i.e. when the line sensor 30 is not set to the in-focus condition, out-of-register occurs in which the green spot SG is offset from the red spot SR.

Figure 7:
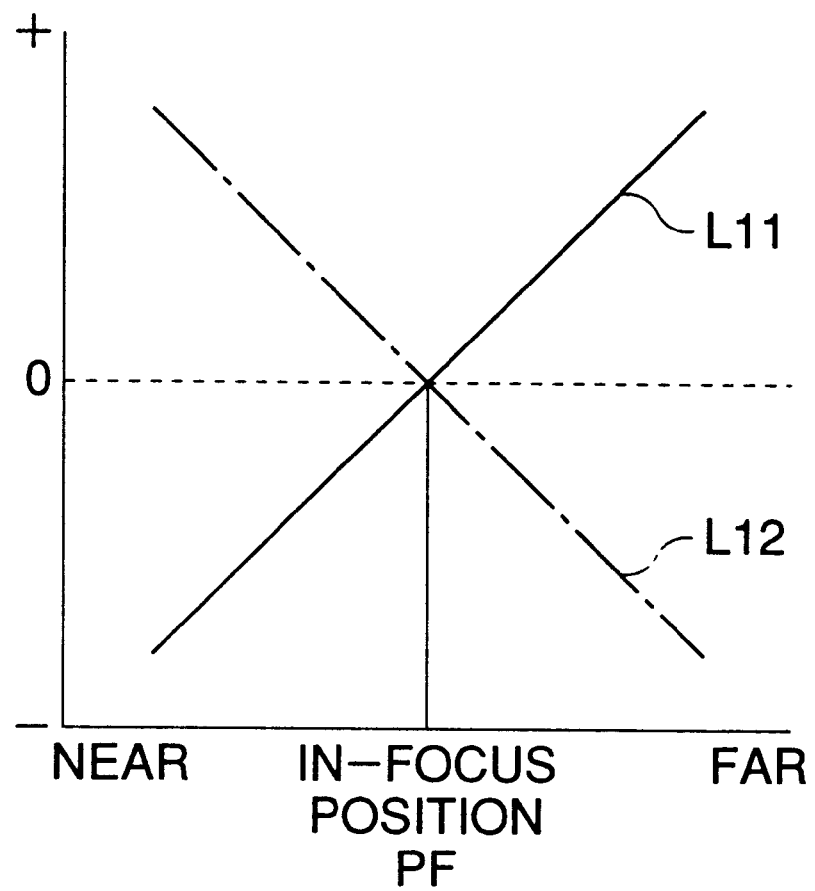
FIG. 7 is a view showing a relationship between an out-of-register value and a distance from a line sensor to a forming lens.

FIG. 7 shows a relationship between the out-of-register value and a distance from the line sensor 30 to the forming lens 31. Reference L11 indicates an out-of-register value of the green spot relative to the red spot. When the line sensor 30 is placed at the in-focus position PF, out-of-register does not occur. Conversely, when the line sensor 30 is displaced towards the forming lens 31, relative to the in-focus position PF, out-of-register occurs in the negative side, and when the line sensor 30 is displaced away from the forming lens 31, relative to the in-focus position PF, out-of-register occurs in the positive side. Similarly, reference L12 indicates an out-of-register value of the blue spot relative to the red spot. Since the light-emitting diode 21B is placed at a position opposite to the light-emitting diode 21G about the light-emitting diode 21R, a direction of out-of-register of the blue spot is opposite to that of the green spot. Namely, the out-of-register value of the blue spot changes in accordance with the distance from the line sensor 30 to the forming lens 31, as shown by the line L12.

When the absolute value of the out-of-register value relative to the standard light beam, which is radiated from the light-emitting diode 21R positioned at the center of the three light-emitting diodes, is a minimum, the line sensor 30 is at the in-focus position. Therefore, by sensing the out-of-register value, the in-focus position PF can be detected.

Conversely, when out-of-register occurs, the difference between the incident amount of the standard light beam and the incident amount of the other light beams is increased in each of the pixel data sensed by the line sensor 30, so that the difference between the pixel data of the standard color (i.e. red) and the pixel data of the other colors (i.e. green and blue) is increased. Therefore, the out-of-register value can be determined based on the pixel data, i.e. the amount of light represented by each pixel data, sensed by the line sensor 30. In the third embodiment, since the out-of-register value is an offset value of the green and blue light beams relative to the red light beam, the line sensor 30 is at the in-focus position when the absolute values of the difference between pixel data of the green and blue components and pixel data of the red component, which is the standard light beam, is the minimum.

Also, in the third and fourth embodiments, the film M is moved along the optical axis of the collimator lens 21, instead of the line sensor 30, so that an in-focus condition is obtained.

Figure 8:
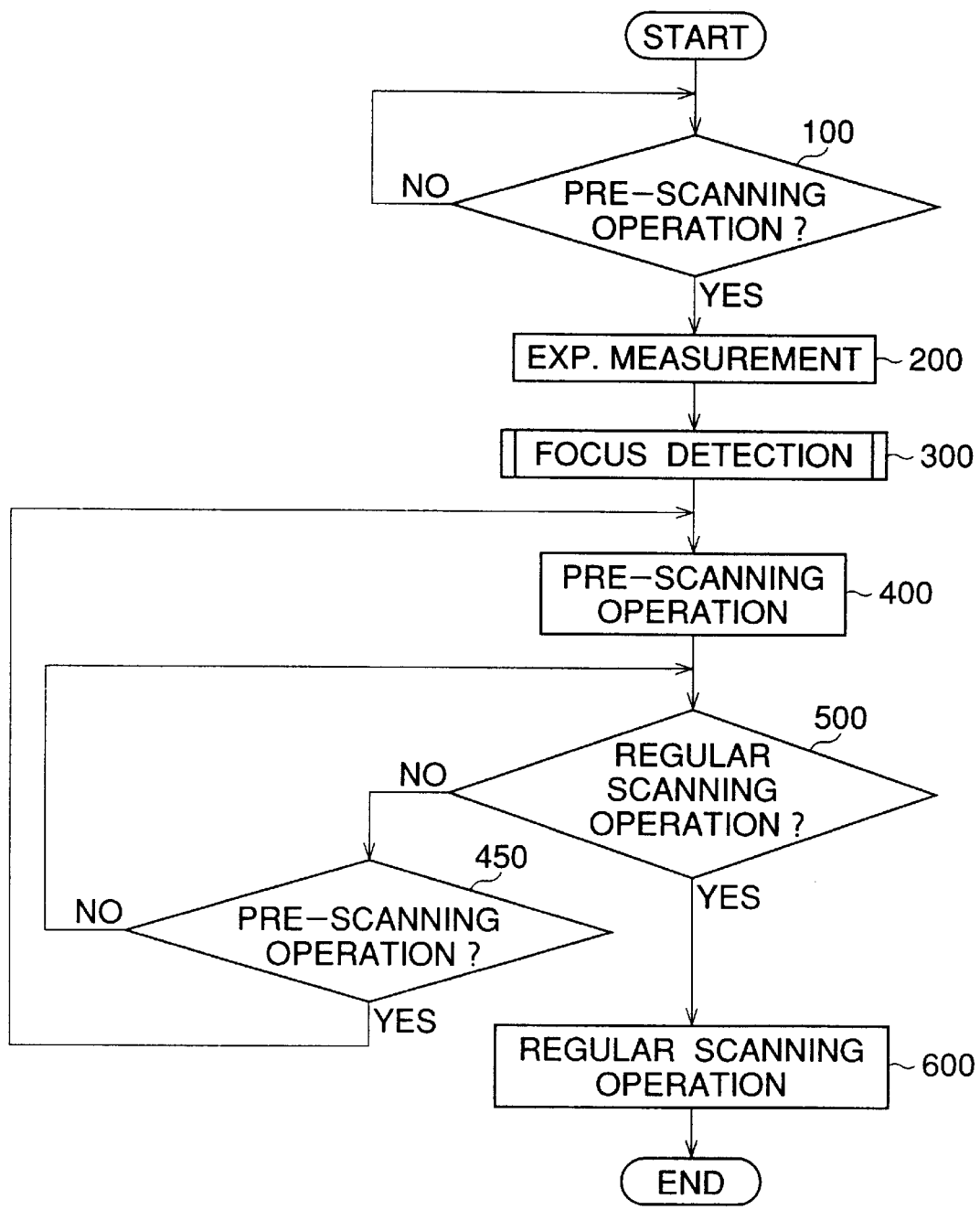
FIG. 8 is a flowchart of an image reading routine, executed in the image reading device, in which the in-focus position is detected.

FIG. 8 is a flowchart of an image reading routine, which is executed in the image reading device, and in which the in-focus position is detected.

In step 100, it is determined whether a pre-scanning operation is to be performed. When a predetermined label indicated on the surface of the display device connected to the computer 60 is clicked, the process goes from Step 100 to Step 200, so that an exposure measurement is carried out. Namely, while the light-emitting diodes 21G, 21R and 21G are turned ON in a predetermined order, the film M is intermittently moved, via the film moving mechanism 10, with a pitch which is coarser than that of a regular scanning operation performed in Step 600. During the intermittent movement, the line sensor 30 is exposed for a predetermined exposure time, so that pixel data of one frame image are detected. Thus, in the exposure measurement, the light source 20 is controlled in such a manner that the light-emitting diodes 21R, 21G and 21B are illuminated in a predetermined order every time the stage 12 is stopped, so that R, G and B pixel data are obtained. In the exposure measurement, based on the output signal (i.e. the pixel data) of the line sensor 30, an optimum exposure time is obtained in such a manner that the level of the output signal of the line sensor 30 becomes optimum. The optimum exposure measurement is well-known, and thus not described herein.

Figure 9:
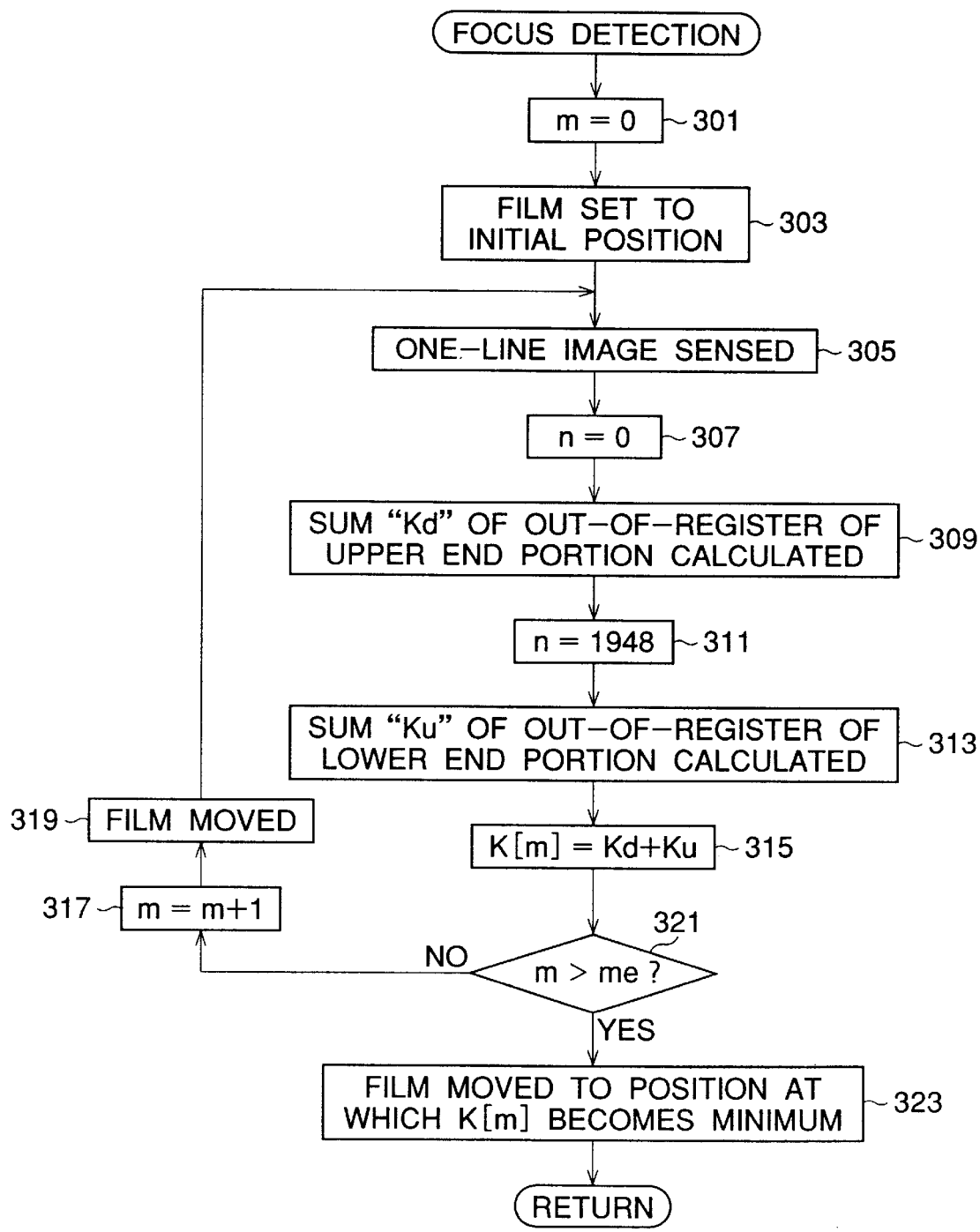
FIG. 9 is a flowchart of an in-focus position detecting routine executed in the third embodiment.

In Step 300, an in-focus position detecting routine shown in FIG. 9 is performed. Namely, the film M is intermittently moved in the direction shown by the arrow C in FIG. 6, so that pixel data are sensed by the line sensor 30 in each of the stopped positions. When the difference between the pixel data of the green component and the pixel data of the red component, i.e. the out-of-register value of the green light beam relative to the red light beam, becomes a minimum, the film M is at the in-focus position.

In Step 400, a pre-scanning operation is performed in accordance with the optimum exposure time obtained in Step 200. In the pre-scanning operation, the image recorded in the film M is read with a reading pitch, which is coarser than that of the regular scanning operation performed in Step 600. In the pre-scanning operation, the light-emitting diodes 21G, 21R and 21B are illuminated in a predetermined order every time the stage 12 is stopped, so that green, red and blue pixel data are detected line by line. The pixel data outputted from the line sensor 30 are transmitted to the computer 60, so that the image is indicated on the surface of the display device.

In Step 500, it is determined whether the regular scanning operation is to be started. When the regular scanning operation is not to be started, Step 450 is executed in which it is determined whether the pre-scanning operation is again to be performed. When the pre-scanning operation is to be carried out again, the process goes back to Step 400, and when the pre-scanning operation is not to be started, the process goes back to Step 500. Conversely, when the regular scanning operation is to be started, Step 600 is performed so that the regular scanning operation is carried out. Namely, the image recorded in the film M is read with a reading pitch which is finer than that of the pre-scanning operation. Then, this routine ends.

Note that, during the execution of this routine, if an interruption process is initiated in accordance with an inputted command to the computer 60, this routine ends, and thus the film M is ejected from the image reading device.

FIG. 9 shows the in-focus position detecting routine executed in Step 300 of FIG. 8. In Step 301, a parameter "m" is set to 0. The parameter "m" corresponds to a vertical position of the film M. For example, in FIG. 6, when the film M is moved from a position PC, which corresponds to the position PA, to a position PD, which corresponds to the position PB, the initial value "0" implies the vertical position PC.

Figure 10:
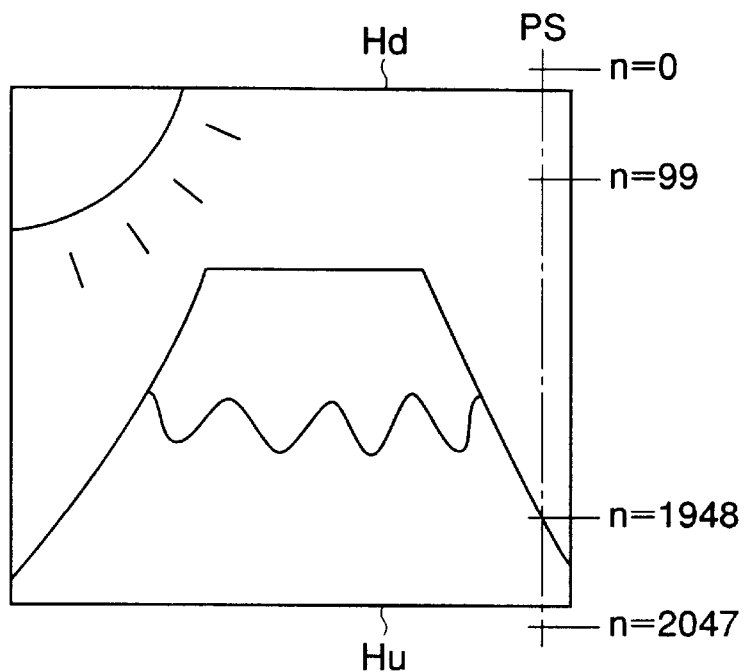
FIG. 10 is a view showing an image recorded in the film.

In Step 303, the film M is set to the initial vertical position PC, and an initial horizontal position. The initial horizontal position corresponds to a peripheral portion PS of an image recorded in the film M as shown in FIG. 10, to which the light source 20 radiates a light beam when the exposure measurement is completed. Thus, when Step 303 is executed, the film M has already been positioned at the initial horizontal position, so that the in-focus position detecting operation can be started without moving the film M in the horizontal direction when the exposure measurement ends.

In Step 305, the light-emitting diodes 21G, 21R and 21B are turned ON in a predetermined order, and thus green, red and blue line images corresponding to the position PS are sensed by the line sensor 30, so that pixel data corresponding to the green, red and blue line images are stored in the memory 46.

In Step 307, a parameter "n" is set to 0. The parameter "n" corresponds to a position of a pixel arranged on the line sensor 30 in the longitudinal direction.

In Step 309, each of the pixel data is read from the memory 46, so that a sum Kd of the out-of-register values at an upper end portion of the image of the film M is obtained. Since out-of-register markedly occurs at both end portions of the line sensor 30, when the line sensor 30 and the film M are disposed as shown in FIG. 2, out-of-register markedly occurs at the upper and lower end portions of the film M shown in FIG. 10. Therefore, the sum Kd of the out-of-register values is calculated according to formula (1) about the end portions of the image, i.e. pixels corresponding to a range in which the parameter "n" is increased from 0 to 99, for example, as shown in FIG. 10.

$$Kd = \sum_{x=0}^{99} (G[n] - R[n])^2 + \sum_{x=0}^{99} (B[n] - R[n])^2 \qquad (1)$$

wherein G[n] is pixel data of a green component, R[n] is pixel data of a red component, and B[n] is pixel data of a blue component.

The sum Kd of the out-of-register values is obtained by summing up the out-of-register values of pixels, contained in a predetermined range. The out-of-register values of the pixels are obtained by adding the respective out-of-register values of the green light beam relative to the red light beam, to the out-of-register values of the blue light beam relative to the red light beam. Namely, the out-of-register values are obtained by adding the square of the difference between a red pixel data and a green pixel data, to the square of the difference between a red pixel data and a blue pixel data. Alternatively, only a sum of the out-of-register values of the green light beam relative to the red light beam may be calculated, since the blue component is generally smaller than the green component. In this case, the sum Kd of the out-of-register values is calculated by formula (2).

$$Kd = \sum_{x=0}^{99} (G[n] - R[n])^2 \qquad (2)$$

In Step 311, the parameter "n" is set to 1948. The value of the parameter "n" is determined depending upon the total number of pixels arranged on the line sensor 30 in the longitudinal direction. In this embodiment, the total number of pixels is 2047.

In Step 313, in a same way as the sum Kd of the out-of-register values of the upper end portion of the image is calculated, the sum Ku of the out-of-register values of the lower end portion is calculated. Namely, the sum Ku of the out-of-register values of a pixel, corresponding to a range in which the parameter "n" is between 1948 and 2047 (see FIG. 10), is calculated according to formula (3):

$$Ku = \sum_{x=1948}^{2047} (G[n] - R[n])^2 + \sum_{x=1948}^{2047} (B[n] - R[n])^2 \qquad (3)$$

Alternatively, the sum Ku of the out-of-register values can be calculated according to formula (4):

$$Ku = \sum_{x=1948}^{2047} (G[n] - R[n])^2 \qquad (4)$$

In step 315, the sum K[m] of the out-of-register values in which the film M is placed at a position corresponding to the parameter "m", is calculated. The sum K[m] of the out-of-register values is obtained by adding the sum Kd of the out-of-register values at the upper end portion and the sum Ku of the out-of-register values at the lower end portion, as indicated by formula (5):

$$K[m] = Kd + Ku \qquad (5)$$

In Step 321, it is determined whether the parameter "m" is greater than the end value "me". When the parameter "m" is greater than the end value "me", i.e. when film M has reached the position PD corresponding to the position PB (see FIG. 6), Step 323 is executed.

Figure 11:
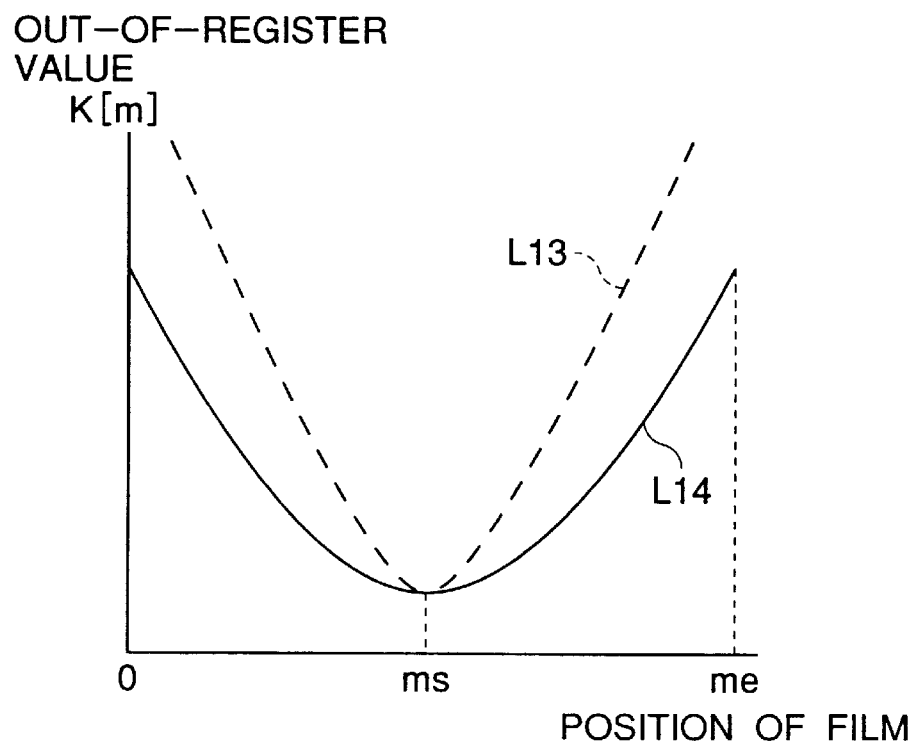
FIG. 11 is a view showing a change of a sum of out-of-register values relative to a position of the film.

In Step 323, the parameter "m" in which the sum K[m] of the out-of-register values becomes minimum is obtained. FIG. 11 shows a change in the sum K[m] of the out-of-register values relative to a position of the film M. A line L13 indicates the sum K[m] of the out-of-register values in which the sums Kd and Ku of the out-of-register values at the upper and lower end portions of the image are calculated according to formulas (1) and (3), and a line L14 indicates the sum K[m] of the out-of-register values in which the sums Kd and Ku are calculated according to formulas (2) and (4). Thus, the film M is moved to a position, corresponding to the parameter "ms" at which the sum K[m] becomes a minimum, i.e. to obtain the in-focus position corresponding to PF, and this routine ends.

Conversely, when it is determined in Step 321 that the parameter "m" is less than or equal to the end value "me", the parameter "m" is increased by 1 in Step 317, and the film M is moved to a position corresponding to the parameter "m" in Step 319. Then, the process goes back to Step 305, so that the process is executed until it is determined in Step 321 that the parameter "m" has become greater than the end value "me".

As described above, in the third embodiment, the sum K[m] of the out-of-register values, which is a parameter of the in-focus position detection, is calculated based on the sum of the difference between the red pixel data and the other color component pixel data. Therefore, even if pixel data have noise, the in-focus position is performed with a high accuracy.

Further, in the third embodiment, since the in-focus position is detected by sensing the position of the film M when the sum K[m] of the out-of-register values becomes a minimum, the in-focus position is detected without requiring a complicated filtering process.

Furthermore, in the third embodiment, since the sum K[m] of the out-of-register values is calculated only based on the pixel data corresponding to the end portions in the longitudinal direction of the line sensor 30, the amount of pixel data used in the calculation is relatively small, so that the in-focus position can be obtained quickly.

Note that the in-focus position can be detected by moving the line sensor 30 and the forming lens 31, instead of moving the film M.

Figure 12A:
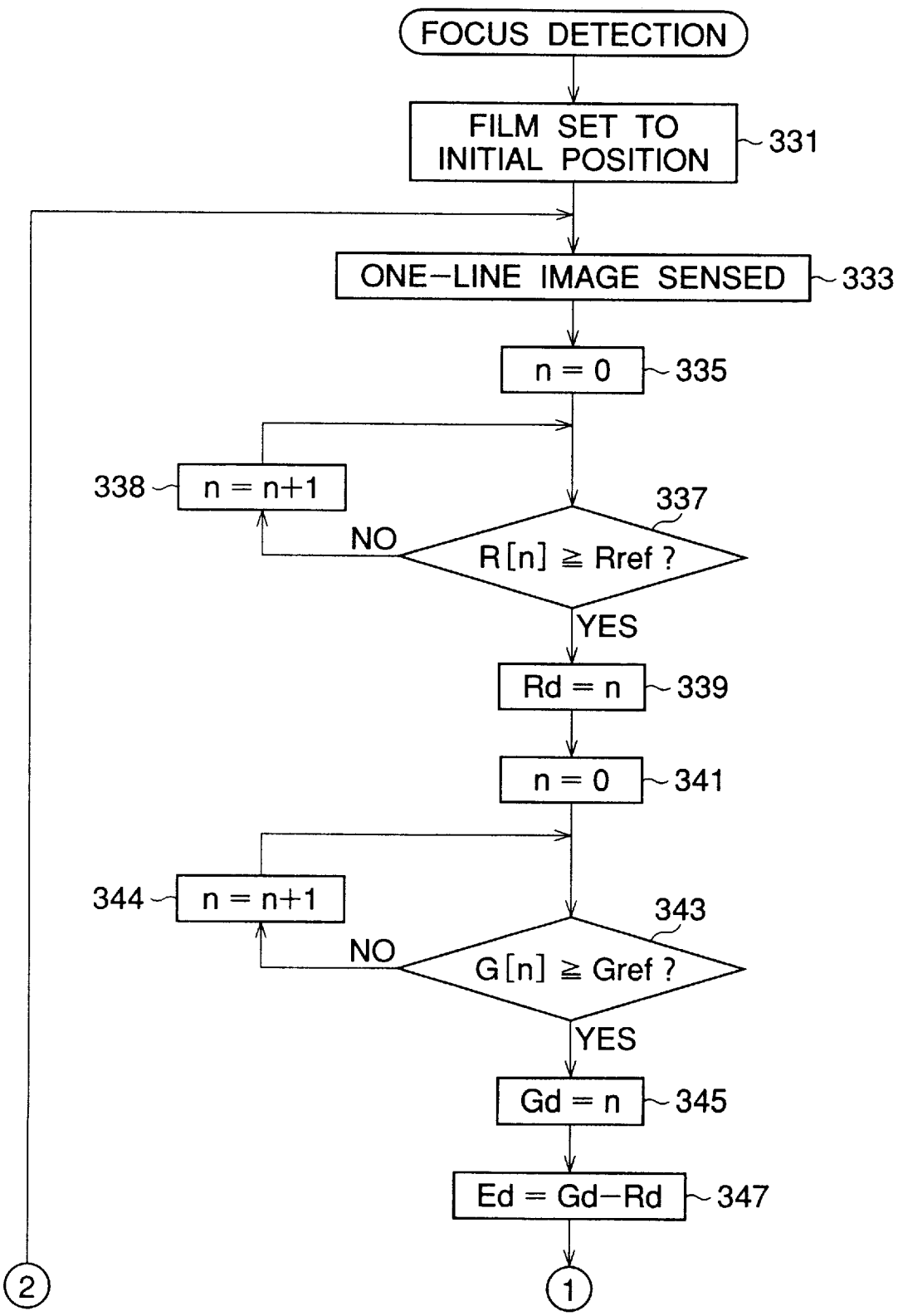
FIGS. 12A and 12B show a flowchart of an in-focus position detecting routine executed in the fourth embodiment.
Figure 12B:
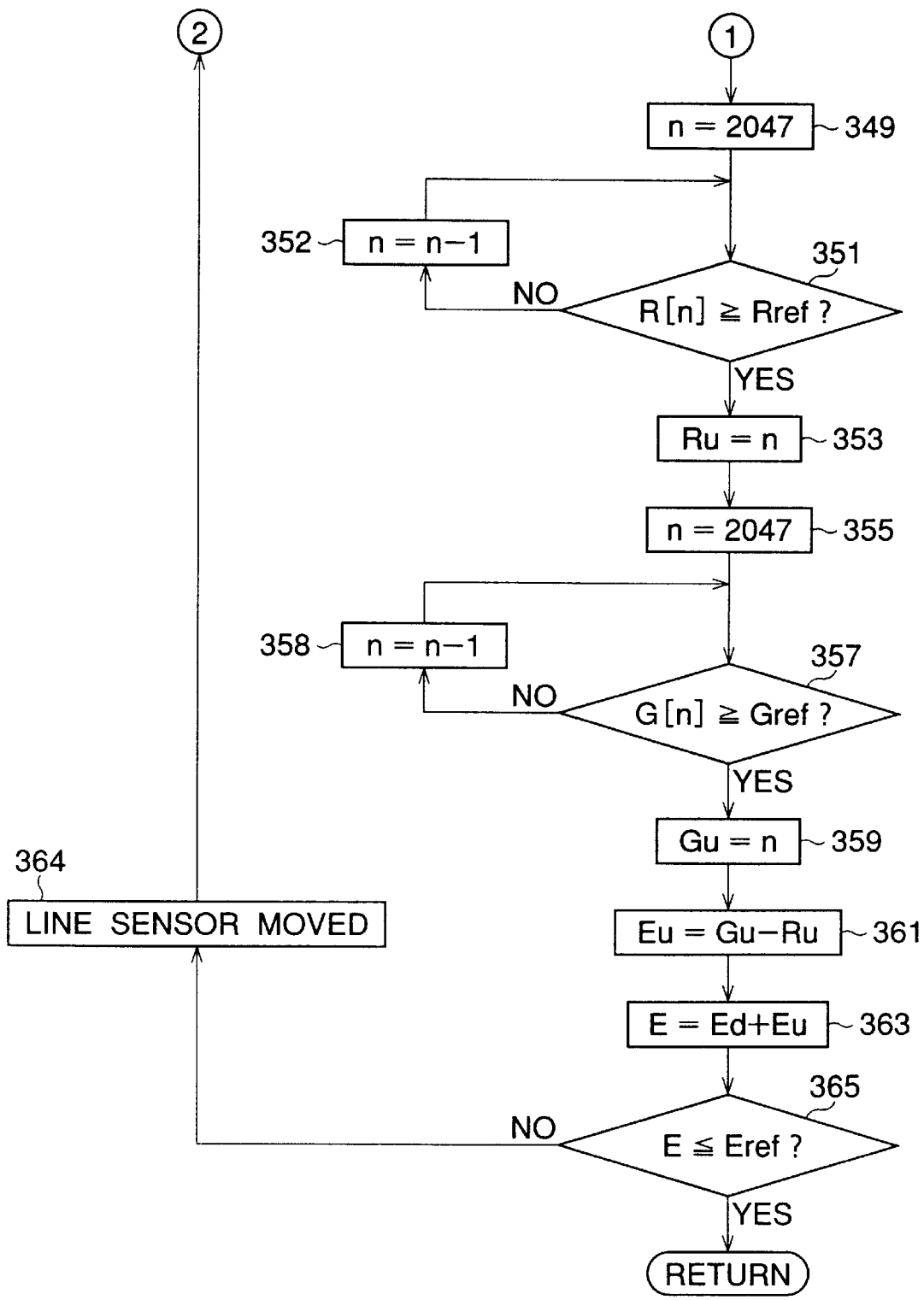

With reference to FIGS. 12A and 12B, a fourth embodiment of the present invention is described below. The difference from the third embodiment is that the in-focus position detecting routine shown in FIGS. 12A and 12B is executed in Step 300 of FIG. 8 instead of that shown in FIG. 9, with the other points being the same as the third embodiment.

In Step 331, the film M is set to the initial vertical position PC, and the initial horizontal position, similar to Step 303 of FIG. 9.

In Step 333, the light-emitting diodes 21G, 21R and 21B are turned ON in a predetermined order, and thus green, red and blue line images corresponding to the position PS are sensed by the line sensor 30, so that pixel data corresponding to the green, red and blue line images of the position PS are stored in the memory 46.

In Step 335, a parameter "n" is set to 0. The parameter "n" corresponds to a position of a pixel arranged on the line sensor 30 in the longitudinal direction, and the parameter "n=0" corresponds to the position of a pixel positioned at an upper end portion of the reading area of the line sensor 30.

Then, Steps 337, 338 and 339 are executed, so that an edge portion Rd (see FIG. 10) of the red component is detected. Namely, a boundary between a base of the film M, which has not been exposed, and a recorded area, which has been exposed, is detected.

It is supposed that the film M is a positive film in which the base is black. In Step 337, the pixel data R[n], which is red component data of a position corresponding to the parameter "n", is read from the memory 46, and it is determined whether the pixel data R[n] is greater than or equal to a reference value "Rref" of the red component. The pixel data outside the edge portion Rd has a greatly different value from the pixel data inside the edge portion Rd. Therefore, due to the determination, the edge portion Rd of the red component is detected.

When it is determined in Step 337 that the pixel data R[n] is less than the reference value "Rref", Step 338 is executed in which the parameter "n" is increased by 1, and thus Step 337 is executed again. Conversely, when it is determined in Step 337 that the pixel data R[n] is greater than or equal to the reference value "Rref", Step 339 is executed in which a red component edge position Rd is set to the value Ant corresponding to the position of the pixel producing the pixel data R[n].

In Step 341, the parameter "n" is again set to 0. Then, Steps 343, 344 and 345 are executed, so that an edge portion Hd of the green component is detected, in a similar way as Steps 337 through 339. Namely, in Step 343, the pixel data G[n] is read from the memory 46, and it is determined whether the pixel data G[n], which is green component data of a position corresponding to the parameter "n", is greater than or equal to a reference value "Gref" of the green component. When it is determined in Step 343 that the pixel data G[n] is less than the reference value "Gref", Step 344 is executed in which the parameter "n" is increased by 1, and thus Step 343 is executed again. Conversely, when it is determined in Step 343 that the pixel data G[n] is greater than or equal to the reference value "Gref", Step 345 is executed in which a green component edge position Gd is set to the value "n" corresponding to the position of the pixel producing the pixel data G[n].

Then, in Step 347, the out-of-register value Ed is obtained according to formula (6), in which the red component edge position Rd is subtracted from the green component edge position Gd.

$$Ed = Gd - Rd \quad (6)$$

Similarly to the detection of the upper edge position Hd (see FIG. 10), a lower edge position Hu (see FIG. 10) is detected in Steps 349 to 361. In Step 349, the parameter "n" is set to 2047, which corresponds to a position of a pixel positioned at the lower end of the reading area of the line sensor 30. In Step 351, the pixel data R[n] is read from the memory 46, and it is determined whether the pixel data R[n] is greater than or equal to a reference value "Rref" of the red component. When it is determined in Step 351 that the pixel data R[n] is less than the reference value "Rref", Step 352 is executed in which the parameter "n" is decreased by 1, and thus Step 351 is executed again. Conversely, when it is determined in Step 351 that the pixel data R[n] is greater than or equal to the reference value "Rref", Step 353 is executed in which a red component edge position Ru is set to the value "n" corresponding to the position of the pixel producing the pixel data R[n].

In Step 355, the parameter "n" is again set to 2047. In Step 357, the pixel data G[n] is read from the memory 46, and it is determined whether the pixel data G[n] is greater than or equal to a reference value "Gref" of the green component. When it is determined in Step 357 that the pixel data G[n] is less than the reference value "Gref", Step 358 is executed in which the parameter "n" is decreased by 1, and thus Step 357 is executed again. Conversely, when it is determined in Step 357 that the pixel data G[n] is greater than or equal to the reference value "Gref", Step 359 is executed in which a green component edge position Gu is set to the value "n" corresponding to the position of the pixel producing the pixel data G[n].

Then, in Step 361, the out-of-register value Eu is obtained according to formula (7), in which the red component edge position Ru is subtracted from the green component edge position Gu. In Step 363, a sum E of the out-of-register values is obtained according to formula (8), in which the out-of-register value Ed is added to the out-of-register value Eu.

$$Eu=Gu-Ru \quad (7)$$

$$E=Ed+Eu \quad (8)$$

Figure 13:
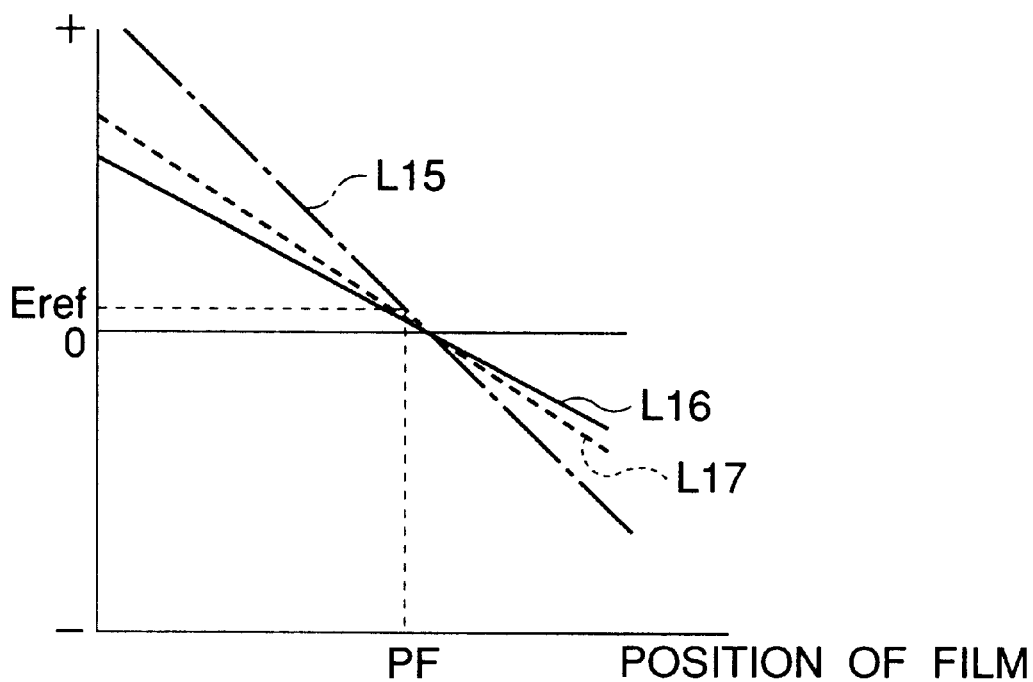
FIG. 13 is a view showing a relationship between a position of the film and a change in out-of-register values.

The sum E of the out-of-register values, the out-of-register value Ed and the out-of-register value Eu are changed relative to a position of the film M. As shown in FIG. 13, a line L15 indicates a change in the sum E of the out-of-register values, a line L16 indicates a change in the out-of-register value Eu and a line L17 indicates a change of the out-of-register value Ed as the film position alters.

In Step 365, it is determined whether the sum E of the out-of-register values is less than or equal to a reference value "Eref". When the sum E of the out-of-register values is less than or equal to the reference value "Eref", it can be deemed that out-of-register of the green component relative to out-of-register of the red component does not exist. Therefore, the film M is at the in-focus position (corresponding to position PF shown in FIG. 13). Thus, this subroutine ends with the film M being set at this position.

Conversely, when it is determined in Step 365 that the sum E of the out-of-register values is greater than the reference value "Eref", i.e. when the film H is placed at a position corresponding to the left side of the point PF in FIG. 13, Step 364 is executed in which the film M is moved in a direction corresponding to a rightward direction in FIG. 13. Then, Step 333 is again executed.

Note that, in the fourth embodiment, when the film M is a negative film, the directions of the inequality signs in Steps 337, 343, 351 and 357 are inversed, since the transmittance ratio of a recorded area of the film M, which has been exposed, is lower than that of a base of the film M, which has not been exposed.

According to the fourth embodiment, the same effects as those of the third embodiment are obtained. Further, in the fourth embodiment, the out-of-register values are obtained by detecting the edge positions of the red and green images while the film M is moved from the position PC to the position PD, which are shown in FIG. 6, and then, when the sum E of the out-of-register values becomes less than or equal to the reference value "Eref", the film M is determined as being at the in-focus position. Thus, the calculations of the out-of-register values are carried out only while the film M is moved from the position PC to the in-focus position. Therefore, the calculation speed of the out-of-register values is improved in comparison with the third embodiment, in which the out-of-register values are calculated while the film M is moved from the position PC to the position PD.

Figure 14:
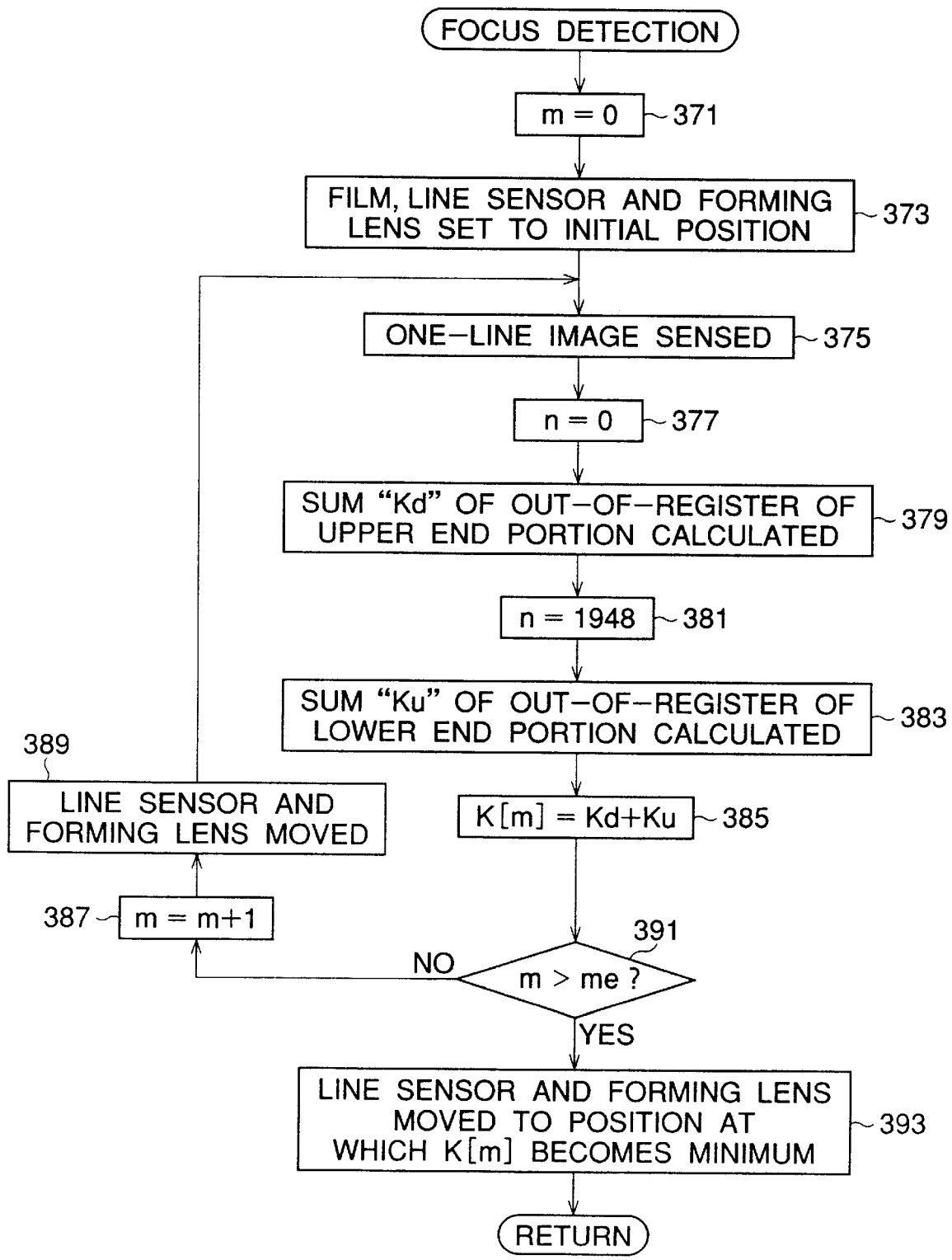
FIG. 14 is a flowchart of an in-focus position detecting routine executed in a fifth embodiment.

FIG. 14 shows the in-focus position detecting routine executed in a fifth embodiment, and corresponds to FIG. 9 of the third embodiment. In FIG. 14, "70" is added to reference numerals of Steps corresponding to those of FIG. 9 and those Steps identical to those of FIG. 9 are not discussed again. That is, Step 371 corresponds to Step 301 of FIG. 9. The mechanical optical and electrical constructions are basically the same as those shown in FIGS. 1, 2 and 3.

In the fifth embodiment, the line sensor 30 and the forming lens 31 are integrally moved along the optical axis of the forming lens 31, by the second moving mechanism 19. The forming lens 31 is a telecentric optical system. Therefore, by moving the line sensor 30 and the forming lens 31 with the film M set at a predetermined position by the film moving mechanism 10, the in-focus position detecting operation can be performed while keeping the magnification of an image formed on the light receiving surface of the line sensor 30 constant.

In Step 373, the film M is set to the initial horizontal position, which corresponds to the peripheral portion PS of an image recorded in the film M as shown in FIG. 10. Further, in Step 373, the line sensor 30 and the forming lens 31 are set to initial positions, respectively, along the optical axis of the forming lens 31. The initial position of the line sensor may be the position PA shown in FIG. 6.

In Step 389, the line sensor 30 and the forming lens 31 are moved to a position corresponding to the parameter "m" set in Step 387.

In Step 393, the line sensor 30 and the forming lens 31 are moved to a position corresponding to the parameter "ms" at which the sum K[m] of the out-of-register values becomes a minimum.

Note that, if it is acceptable for the magnification of the image to change, the device may be constructed in such a manner that only the line sensor 30 is moved while fixing the forming lens 31 is stationary.

Finally, of course, as described herein, only three light-emitting diodes 21R, 21G, 21B radiating red, green and blue color components, respectively, have been utilized. However, further light-emitting diodes emitting further color-components may be incorporated as replacements to or in addition to the original light-emitting diodes enabling an increased variety of requirements to be handled by embodiments one through five.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-228845 (filed on Aug. 11, 1997) and No. 9-241832 (filed on Aug. 22, 1997) which are expressly incorporated herein, by reference, in their entirety.

What is claimed is:

1. An illumination optical device provided in an image reading device, comprising: a plurality of light-emitting elements arranged on a straight line, said light-emitting elements radiating light beams of color components which are different from each other; an optical system disposed such that the optical axis of said optical system is perpendicular to said straight line, so that said light beams are radiated onto a recording medium; and wherein said optical system comprises a first optical element and a second optical element, said first optical element changing said light beams to parallel beams in a plane containing said straight line, and said second optical element condensing said light beams in a direction perpendicular to said plane.

2. An illumination optical device according to claim 1, wherein said recording medium is disposed such that said recording medium is illuminated by each of said color components.

3. An illumination optical device according to claim 1, wherein said plurality of light-emitting elements are separately turned ON in a predetermined order.

4. An illumination optical device according to claim 1, wherein said straight line passes through a focal point of said optical system.

5. An illumination optical device according to claim 1, wherein said plurality of light-emitting elements includes a first light-emitting element, disposed on said optical axis, having the smallest size among said plurality of light-emitting elements.

6. An illumination optical device according to claim 5, wherein said first light-emitting element is disposed at the center of said plurality of light-emitting elements.

7. An illumination optical device according to claim 1, wherein said plurality of light-emitting elements includes N light-emitting elements, emitting N kinds of color component light beams, respectively.

8. An illumination optical device according to claim 1, wherein said plurality of light-emitting elements includes first, second and third light-emitting elements, emitting red, green and blue component light beams, respectively.

9. An illumination optical device according to claim 1, wherein said light beams enter said first optical element and then enter said second optical element.

10. An illumination optical device according to claim 9, wherein said second optical element comprises a cylindrical lens.

11. An illumination optical device according to claim 9, wherein said second optical element comprises a concave mirror.

12. An illumination optical device according to claim 1, wherein said light beams radiated onto said recording medium are sensed by a line sensor.

13. An image reading device comprising:
  a light source that radiates first, second and third light beams having first, second and third color components, respectively;
  a first optical system that changes said first light beam to a first parallel beam, which is parallel to the optical axis of said first optical system, and changes said second and third light beams to second and third parallel beams, respectively, which are inclined to said optical axis, said first, second and third parallel beams being led to a recording medium in which an image is recorded;
  an imaging device that includes a light receiving surface on which said image is formed, said imaging device outputting pixel data corresponding to said image;
  a second optical system that forms said image on said light receiving surface based on said first, second and third parallel beams becoming incident on said recording medium;
  an out-of-register detecting processor that detects an out-of-register value in accordance with said pixel data, said out-of-register value being a deviation between first and second portions on said light receiving surface, said first portion being illuminated by a light beam corresponding to said first parallel beam radiated on an area of said recording medium, said second portion being illuminated by a light beam corresponding to one of said second and third parallel beams radiated on said area; and
  a moving mechanism that moves at least one of said recording medium and said imaging device along the optical axis of said first optical system in accordance with said out-of-register value.

14. A device according to claim 13, wherein said moving mechanism moves said second optical system together with said imaging device.

15. A device according to claim 13, wherein said first, second and third color components are red, green and blue, respectively.

16. A device according to claim 13, wherein said out-of-register detecting processor detects said out-of-register value during the movement of said recording medium by said moving mechanism, said moving mechanism disposing said recording medium at a position where said out-of-register value is a minimum.

17. A device according to claim 13, wherein said out-of-register detecting processor detects said out-of-register value during the movement of said imaging device by said moving mechanism, said moving mechanism disposing said imaging device at a position where said out-of-register value is a minimum.

18. A device according to claim 13, wherein said out-of-register detecting processor detects said out-of-register value by calculating a total difference between said pixel data corresponding to said first color component and said pixel data corresponding to at least one of said second and third color components.

19. A device according to claim 13, wherein said out-of-register detecting processor detects a first edge of said image of said first color component and a second edge of said image of at least one of said second and third color components, and calculates a difference between a position of said first edge and a position of said second edge so that said out-of-register value is obtained.

20. A device according to claim 13, wherein said light source comprises first, second and third light-emitting elements radiating red, green and blue light beams, respectively, said first, second and third light-emitting elements being arranged on a straight line perpendicular to the optical axis of said first optical system.

21. A device according to claim 20, wherein a smallest light-emitting element, being one of said first, second and third light-emitting elements, is positioned on the optical axis of said first optical system and symmetrically between the two remaining light-emitting elements.

22. A device according to claim 21, wherein said smallest light-emitting element radiates said first light beam.

* * * * *